(12) United States Patent
Kroeger et al.

(10) Patent No.: US 8,700,999 B2
(45) Date of Patent: Apr. 15, 2014

(54) CAROUSEL USER INTERFACE FOR DOCUMENT MANAGEMENT

(75) Inventors: Robert Kroeger, Kitchener (CA); Ian Chadwyck Faragher, Kitchener (CA); Fady Samuel, Kitchener (CA); Cosmin Truta, Waterloo (CA); Varun Jain, Kitchener (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/210,051

(22) Filed: Aug. 15, 2011

(65) Prior Publication Data

US 2013/0047079 A1 Feb. 21, 2013

(51) Int. Cl.
*G06F 3/00* (2006.01)

(52) U.S. Cl.
USPC .......................................................... 715/273

(58) Field of Classification Search
USPC .......... 715/200, 252, 273, 777, 277; 781/200, 781/252, 273, 277
See application file for complete search history.

(56) References Cited

U.S. PATENT DOCUMENTS

| | | | |
|---|---|---|---|
| 4,139,901 A * | 2/1979 | Ganske et al. ........................ 1/1 |
| 7,415,666 B2 * | 8/2008 | Sellers et al. ................. 715/251 |
| 7,577,917 B2 | 8/2009 | Vong |
| 7,730,425 B2 | 6/2010 | de los Reyes et al. |
| 7,987,491 B2 * | 7/2011 | Reisman ........................ 725/112 |
| 8,028,250 B2 * | 9/2011 | Vronay et al. ................. 715/853 |
| 2003/0151621 A1 * | 8/2003 | McEvilly et al. .............. 345/744 |
| 2005/0229102 A1 * | 10/2005 | Watson et al. ................. 715/739 |
| 2006/0117340 A1 * | 6/2006 | Pavlovskaia et al. ........... 725/34 |
| 2006/0287058 A1 * | 12/2006 | Resnick et al. ................. 463/19 |
| 2009/0147297 A1 * | 6/2009 | Stevenson .................... 358/1.15 |
| 2009/0265334 A1 * | 10/2009 | Narayanan et al. ............... 707/5 |
| 2010/0083179 A1 * | 4/2010 | Decker et al. ................. 715/830 |
| 2010/0169790 A1 * | 7/2010 | Vaughan et al. .............. 715/740 |
| 2010/0205563 A1 | 8/2010 | Haapsaari et al. |
| 2010/0299630 A1 * | 11/2010 | Mccutchen et al. .......... 715/803 |
| 2010/0304858 A1 * | 12/2010 | Asuke et al. .................... 463/31 |
| 2010/0325589 A1 * | 12/2010 | Ofek et al. ..................... 715/854 |
| 2011/0048266 A1 * | 3/2011 | Crystal et al. ................. 101/483 |

* cited by examiner

*Primary Examiner* — Kyle Stork (74) *Attorney, Agent, or Firm* — Young Basile Hanlon & MacFarlane P.C.

(57) ABSTRACT

Methods and systems for managing open documents are disclosed. Document representations are displayed in a carousel display. Each of the representations displays a document viewport portion of content from a corresponding open document. Upon determining a first gesture associated with a selected representation, a full view of the document viewport portion of the open document corresponding to the selected representation is displayed. The content of the open document displayed in the document viewport portion may be adjusted based upon a user action in the open document. Upon determining a second gesture, the full view of the document viewport portion is closed and the adjusted content is displayed as the document viewport portion in the carousel display. A greater portion of the open document than what is visible in the document viewport portion is displayed.

20 Claims, 7 Drawing Sheets

CAROUSEL USER INTERFACE FOR DOCUMENT MANAGEMENT

TECHNICAL FIELD

The embodiments relate generally to user interfaces for document management.

BACKGROUND

With the rise of multi-processors and multi-processing operating systems, it is not unusual for a user to have multiple documents, applications, programs or web pages (hereinafter together referred to collectively as documents) simultaneously open and running on a single machine. While the processor may be able to handle user desired operations such as browsing or modifying the documents, after a user selects or activates a particular document, the user may desire an effective way by which to organize, view, switch between or manage multiple open or active documents.

Conventional operating systems have proposed several different alternatives for managing a plurality of open documents. For example, older conventional systems displayed a plurality of windows that a user may tile or cascade on the screen. Newer conventional systems have provided the user the capability of opening an application, such as a web browser, with multiple tabs that allow a user to view multiple documents (or web pages) of the same application or program. The user can then select any of the various tabs to activate the corresponding document. However, a user may find it difficult to quickly determine what portion of each document is displayed, relative to the rest of the document.

BRIEF SUMMARY

Methods and systems for providing a carousel user interface display for document management are disclosed herein. According to an embodiment, a plurality of open document representations is displayed in a carousel display. Each representation displays a document viewport portion of a corresponding open document. A document viewport portion is the portion of a document that would be shown in a full view of the application, such as a web page in an opened web browser. Upon determining a first gesture associated with a selected representation, a full view of the document viewport portion may be displayed. The content of the open document that is displayed in the document viewport portion may be adjusted based upon a user action, such as a navigation to a next position in the open document. For example, a user may have scrolled up and down the document to show content not previously displayed.

Upon determining a second gesture, the full view of the document viewport portion may be closed and the selected representation may be displayed in the carousel display. A greater portion of content from the open document than what is visible in the document viewport portion may be displayed in the carousel display. For example, content that falls outside of the document viewport portion may also be shown. Greater portions of documents may be shown for each of the document representations in the carousel display.

Other embodiments of this aspect include corresponding systems, apparatus, and computer programs, configured to perform the actions of the methods, encoded on computer storage devices. Further embodiments, features, and advantages, as well as the structure and operation of the various embodiments are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments are described herein with reference to illustrations for particular applications. It should be understood that the invention is not limited to the described embodiments. Those skilled in the art with access to the teachings provided herein will recognize additional modifications, applications, and embodiments within the scope thereof and additional fields in which the embodiments would be of significant utility.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

Disclosed herein is a carousel display system for providing a carousel for document management. The system herein provides a carousel for managing a number of open or active documents. Unlike conventional displays of multiple documents, the carousel display user interface, described in the embodiments herein, provides a quick way to toggle between multiple open documents and preview what portion of the document was last viewed in its corresponding application. This document viewport portion may be displayed in the context of what the user previously viewed or may yet view. The carousel display system described herein further allows a user to activate or browse amongst the open documents directly from the carousel display.

The carousel display user interface allows the user to see not only a representation of the current document but also representations of any other documents in the carousel display. According to one embodiment, the carousel display also provides the user a preview of each document in the carousel display corresponding to a user's previous operation. Conventional displays do not allow a user to view what portion of a document is being viewed in relation to the rest of the document. For example, a scroll position of a document is not provided. However, the carousel display, described herein, allows a user to view portions of a document outside of the viewport view while the documents are in the carousel display.

Figure 1:
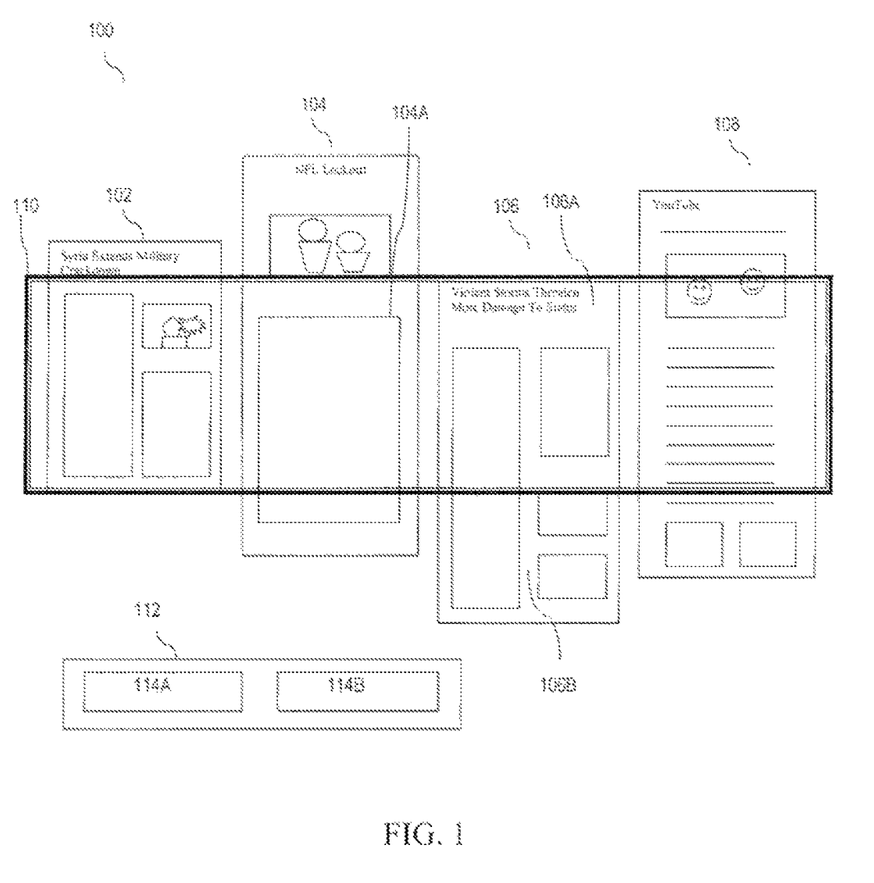
FIG. 1 illustrates an example display view of a carousel display system.

FIG. 1 illustrates an example user view of carousel display 100, according to an embodiment. Carousel display 100 allows a user to manage a number of open or active documents. Carousel display 100 may be a horizontally or vertically arrayed row of open document representations. In various embodiments, carousel display 100 displays representations of open documents. Carousel display 100 also displays corresponding document viewport portions with the representations. Representations and viewports may be different sizes based on the number of documents currently open or the number of document viewport portions displayed within viewport 110. The representations may be shifted horizontally with gestures, such as horizontal swipes.

Open document representations 102, 104, 106 and 108 may represent any documents, application, programs or web pages that may be active or open. The documents may include documents or applications that the user is using in an application, but may have minimized. For example, the document associated with representation 102 may be an open word processing document, document representation 104 may represent an open presentation document, and document representations 106 and 108 may represent open webpage documents. In other examples, document representations 102, 104, 106 and 108 represent any kind of documents or applications, including, but not limited to, web, spreadsheet, presentation, word processing or multimedia documents. In some cases, a document may have been closed in application software, but remains open to some degree in the carousel display. In a further embodiment, carousel display 100 is used to manage a plurality of applications that are running on a mobile phone, tablet or other mobile computing device.

A user may preview, toggle or switch between what documents to work with by selecting the document representations in carousel display 100. To help ease the user's decision making process, viewport 110 emphasizes document viewport portions of each prominent document as a preview to each open or active document. Carousel display 100 provides a carousel viewport 110 that highlights one or more portions of a document that would be visible in a full view of the opened document.

Figure 2:
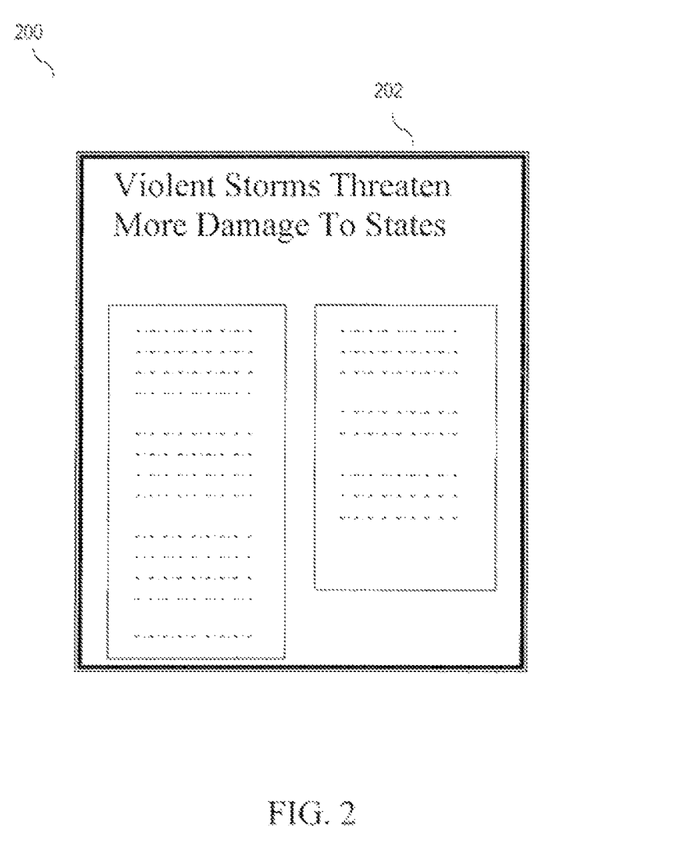
FIG. 2 is an example illustration of usage of the carousel display system of FIG. 1.

FIG. 2 is an example illustration of a full view of a document associated with a document representation. In the example display 200 of FIG. 2, a user using the carousel display system selects and/or activates, from carousel display 100, document representation 106. In response to the selection of document representation 106, the carousel display system provides the user a full-view 202 of the selected document. In an embodiment involving a touch screen surface, a user may have selected, with a single or double finger-tap, document representation 106 from carousel display 100 to enter the full-view 202.

Figure 3:
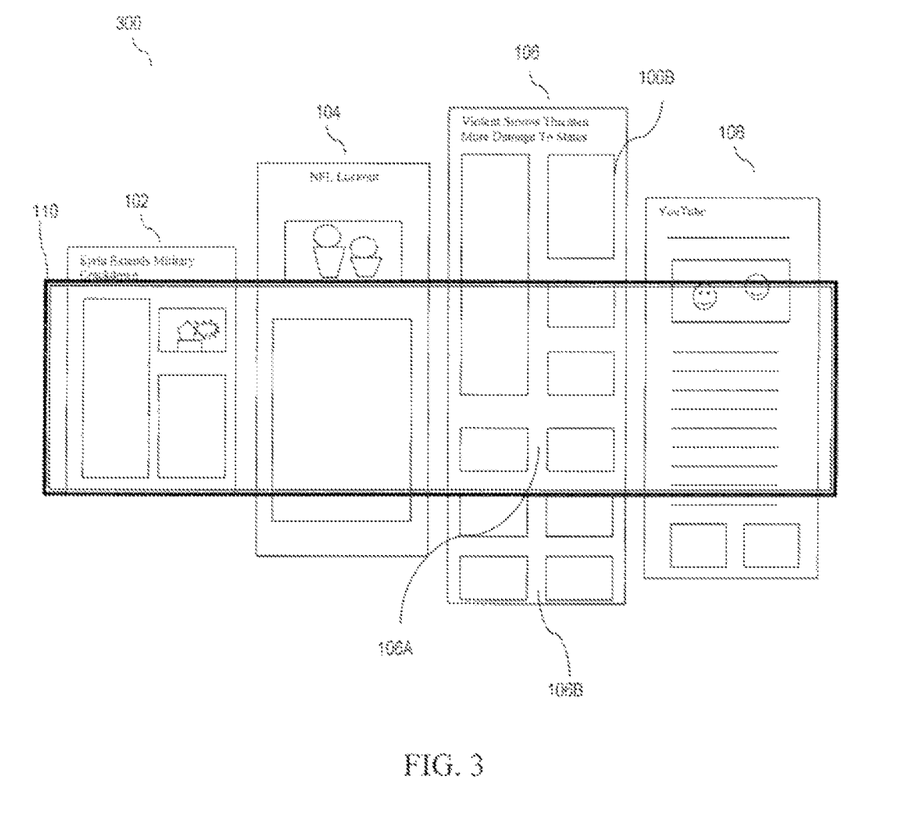
FIG. 3 is an example illustration of usage of the carousel display system of FIG. 1.

Full-view 202 may include any full or expanded view of the selected document(s) as it is opened in its corresponding application. For example, rendering full-view 202 may include rendering the selected document in a web browser application at the same location of the document as when the user had last activated the document. A user may operate on full-view 202 in the appropriate application, scroll through or otherwise access the document as need be and return to carousel view 100 (as shown in FIG. 3) with an updated representation with respect to the document viewport portion. In one embodiment, carousel display 100 closes or hides from view when the document is opened up in the application in full view. In other embodiments, carousel display 100 moves into an inactive state partially or fully hidden behind the application showing full-view 202.

From the normal, full view, the carousel display may be enabled. According to one embodiment, a pinch zoom-out enables the carousel display. The zoom out may need to be beyond a certain zoom scale threshold to activate the carousel display.

When a carousel display is enabled, document viewport portions of one or more open document representations are displayed, such as document viewport portion 106A of document representation 106. A document viewport portion may also be a last portion of a document that was viewed or accessed by a user. For example, as shown for document representation 106, the user may have scrolled to a webpage about violent storms; however, the user may not have scrolled further down document 106 before switching to another application. Thus document viewport portion 106A shows an initial portion of the webpage. Document viewport portion 104A of document representation 104, by contrast, includes a middle portion 104A of the document that the user was last viewing, as shown in FIG. 1.

Document viewport portions allow a user to quickly view the portion of a document last accessed by a user. Carousel display 100 allows a user to see the document viewport portions which may not only be representations of the underlying or corresponding documents, but also actual portions (e.g., text, images, etc.) thereof. In one embodiment, the user may see dynamic content or a video playing in a document viewport portion on the carousel display. In other embodiments, a user may select to halt active display of dynamic content. A user may also pin content in a representation. Document viewport portions may be used to assist accessing, browsing or activating the documents in a carousel display. In some cases, applications that have been minimized, or even closed, may operate in a limited fashion to provide such a display in the representation in the carousel display. In other cases, the carousel display system has the functionality needed to display the actual live content of the document viewport portions.

The size or zoom level of viewport 110 may be adjustable or configurable by a user. The size of the document viewport portions in carousel display 100 may be determined by the number of viewports or representations in carousel display 100. For example, a carousel display that includes ten open documents displays ten representations, and corresponding viewports, at a smaller average size than a carousel display displaying only four open document representations. As the number of document representations displayed in the carousel increases or decreases (e.g., as a result of a user opening or closing documents), the size of the remaining representations and/or document viewport portions of the representations is adjusted to be greater or smaller until a certain limit (e.g., there may be a defined maximum and/or minimum size for the representations and document viewport portions of a carousel display). Carousel display 100 may display a priority or activity indication associated with the documents of representations 102, 104, 106 and 108 based on a user's preferences.

Though the document viewport portions of document representations 102, 104, 106 and 108 are all shown to be of the same size, other embodiments may include document viewports of varying sizes. For example, a user may vary the sizes of particular document viewports based on their relative importance to the user. For example, a more recently accessed document may include a larger document viewport portion in carousel display 100 than another document that has not been accessed for some time. It may be that after the passage of a period of time during which the user has not accessed the document (inactivity period), perhaps every 30 minutes, the size of the document viewport portion corresponding to the inactive document may decrease or the size of the document viewport portion of more active documents may increase. However, there may be a limit as to how small or large a viewport may appear in carousel display 100.

Each document viewport portion may also be associated with a particular zoom or zooming scale relating to how much of a corresponding document may be visible in viewport 110 of carousel display 100. The zooming scale may determine the ratio between the original zoom of the document and the zoom of the corresponding document viewport portion in carousel display 100. For example a ¼ or 25% zooming scale renders a document viewport portion that is a quarter-smaller horizontally and vertically and has a final area that is 16 times smaller than full view size. Conversely, a scale of 2 or 200% produces a document viewport portion that is twice as large horizontally and vertically, and has an area that is 4 times bigger. One example of a reduced sized representation that may be visible or accessible via the carousel is a thumbnail or a favicon, which may include a visual and/or textual representation of the document. In some examples, an integer scale factor (e.g., n=2, 3, 4 . . . nmax) is chosen for the zoom scale of the representations or document viewports of the representations. For instance, n pages will fit on the screen at 1/n of a screen height. All other representations are added at the same size in an adjacent fashion. In some cases, some document representations have a greater zoom level than other document representations because a greater portion of a document representation is visible in carousel display 100.

As may be seen in the embodiment of FIG. 1, each of document representations 102, 104, 106 and 108 may include a document viewport portion that is visible via carousel display 100 and a remaining portion that falls outside of document viewport 110. Greater portions of the document, such as additional portion 106B, may also be shown to provide context for the document viewport portion. In one embodiment, the document viewport portion is emphasized in carousel display 100 and the remaining portion is differentiated or de-emphasized from the document viewport portion. For example, the outside portion of a greater portion is grayed out or the colors otherwise dulled or slightly blurred to differentiate between the document viewport portion and the rest of the document in the representation. A user scrolls the document while viewing carousel display 100 and adjusts what portion of the document will be visible in the full view of a document, for example, when the document is opened in its corresponding application.

In another embodiment, documents of representations 102, 104, 106, 108 may include dynamic content. Dynamic content includes any changing or variable content that may be displayed in a document. For example, dynamic content includes moving images, sounds, updating text, etc. Dynamic content of documents may be active or inactive within carousel display 100. In another example, content in the greater portion that is outside the viewport may or may not be rendered dynamically with the content in the document viewport portion. Documents with dynamic content in carousel display 100 may be configured per a user's preferences. For example, the carousel display system pauses or deactivates the dynamic content included in or amongst the document viewport portions displayed in carousel display 100. In other cases, the dynamic content in all but one (e.g., the most recently activated) document may be paused, thereby preventing a scenario whereby multiple documents with dynamic images and sounds are running simultaneously. Dynamic content in any number of the documents may be allowed to run simultaneously if the user prefers. In another example, every predetermined period of time (e.g., 5 seconds) the dynamic content of a first document is paused, to allow the dynamic content of a second document to run, which then runs through on a round robin basis.

According to one embodiment, carousel display 100 includes a strip of smaller representations, such as tabstrip 112 with one or more tab icons 114A, 114B. Tabstrip 112 may be used to indicate the presence of additional documents which do not appear in carousel display 100. For example, as shown, carousel display 100 includes representations of four documents; however, the user may have six total documents open or active, in which case the additional two documents may be viewable in tabstrip 112 and represented by icons 114A and 114B. In another embodiment, tabstrip 112 includes icons for all six documents, where the documents currently viewable in carousel display 100 are highlighted. Icons 114A and 114B may include any representations of documents including, but not limited to, smaller document viewport portions and visual and/or textual iconic representations of documents. For example, icons 114A and 114B may be represented by a particular symbol or icon generally associated with the document.

In an embodiment, a user has multiple documents open and desires to switch amongst them. Using the carousel display system allows the user to quickly navigate or reorder the various open documents. The user, using the document representations with displayed portions greater than document viewport portions, quickly sees what portion(s) of the documents the user was previously using and easily navigates among the documents using the carousel display.

FIG. 3 is another example carousel display 300 similar to carousel display 100 of FIG. 1. In carousel display 300 of FIG. 3, a user using carousel display 100 may have selected document representation 106 (as shown in FIG. 1), manipulated or otherwise browsed through the content of the document (as discussed above in reference to FIG. 2), and then returned to carousel display view 300 as shown in FIG. 3. When comparing document viewport portion 106A of FIG. 3 with document viewport portion 106A in FIG. 1, the two document viewport portions, though both representing the same document 106, appear differently within the respective carousel displays. This difference reflects the most recent interaction with the document of representation 106. The differences in the document viewport portions may be attributed to a user manipulation or activation of the document. As discussed above, a user may have scrolled through the document in the time between FIG. 1 and FIG. 3 either by activating the document to full-view 202 and/or by scrolling through the viewport of the document while it was displayed as a representation in carousel display 100.

Also, because the document in representation 106 is positioned higher in carousel display 300 of FIG. 3, a bottom portion 106B of the document may be visible in the carousel display 300, when compared to the view of the document representation 106 in carousel display 100 of FIG. 1. When a document (e.g., 106) is too long to be fully displayed on a screen or within the carousel display system 100, a portion of the document, whatever greater portion 106B will fit, may be displayed on a screen to a user. Then, when the document viewport portion of the document is scrolled or otherwise positioned elsewhere with respect to the full document, more or less of the document may be visible when viewing carousel display 100. Carousel display 100 may include an indicator that indicates that there is more to the document than may be rendered as 106B in carousel display 100 or on the screen.

Figure 4:
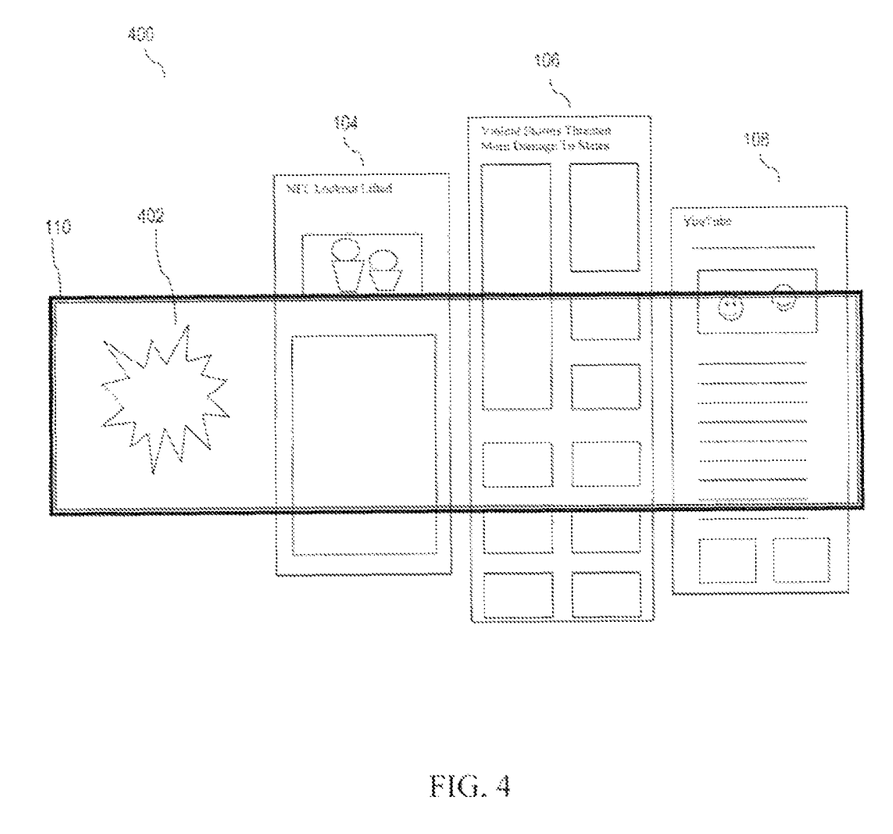
FIG. 4 is an example illustration of usage of the carousel display of FIG. 3.

FIG. 4 is an example illustration of usage of the carousel display 300 of FIG. 3. In carousel display view 400 of FIG. 4, a user using the carousel display 300 of FIG. 3, may have selected the document representation 102 and closed the document as shown by closed document representation 402. The closed document representation 402 may indicate (to a user) that a document (e.g., 102) has been fully closed. Depending on user preferences, documents closed in their respective applications may remain in the carousel display or may be completely removed from the carousel display. Closed document representation 402 may include a graphical representation (such as a paper crumpling) of the document closing and disappearing, whereby the remaining open documents (e.g., 104, 106, 108) may be resized and/or realigned in carousel display 400, now that there is one less document. In another example, if additional documents are open but are not currently visible (e.g., via the tabstrip 112 of FIG. 1), one or more of those documents is presented in carousel display 400, replacing the closed document. In another embodiment, closed document representation 402 simply represents the disappearance of the document (e.g., 102) and the subsequent adjustments of the remaining document representations of the carousel.

In an embodiment where the carousel display system is implemented on a touch screen display, closed document representation 402 is used to indicate to a user that the document is about to close. For example, if the user selects document representation 102 with a close-finger-pinch (on the touch screen) to a certain zoom level, closed document representation 402 may start to appear within carousel display 400. Closed document representation 402 may warn or indicate to the user that the user is about to remove or delete the document from carousel display 400. If, for example, the user removes contact with the touch screen while closed document representation 402 is displayed, the corresponding document representation is removed from carousel display 400 and deactivated. If the user expands the pinch beyond a certain threshold, the corresponding representation of the document reappears. If the user then removes contact from the touchscreen, the representation remains in carousel display 400. The touchscreen implementation is only one possible embodiment of the system described herein. Other embodiments may include non-touchscreen devices or systems.

Figure 5:
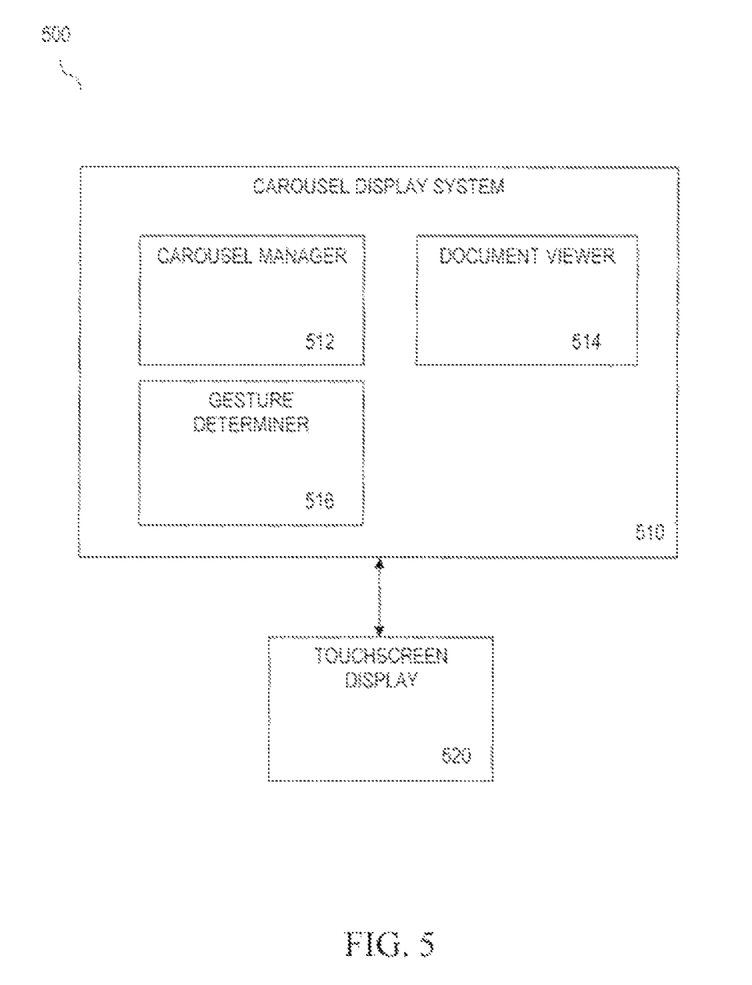
FIG. 5 is a system for document management used in, for example, FIGS. 1-3.

FIG. 5 is an example system 500 for providing a carousel display such as carousel displays 100, 300 and 400. System 500 includes carousel display system 510 coupled to touchscreen display 520. Carousel display system 510 includes components used to provide carousel display 100. Document viewer 514 is configured to determine how document representations 102, 104, 106, 108 are to be loaded and displayed in carousel display 100. Document viewer 514 includes a capability to switch or toggle amongst the various applications corresponding to the documents.

Carousel manager 512 may manage carousel display 100. Carousel manager 512 determines which documents are represented in carousel display 100. Carousel manager 512 may determine or track a user's operation of the documents and provide the representations and viewports within carousel display 100. Similarly, carousel manager 512 may receive user preferences and operations for the carousel display and viewport and adjust the rendering of carousel display 100 accordingly.

Carousel display system 510 is implemented on or implemented with a computing device. For example, carousel display system 510 may be software, firmware, or hardware or any combination thereof in a computing device. A computing device can be any type of computing device having one or more processors. For example, a computing device can be a computer, server, workstation, mobile device (e.g., a mobile phone, personal digital assistant, navigation device, tablet, laptop or any other user carried device), game console, set-top box, kiosk, embedded system or other device having at least one processor and memory. A computing device may include a communication port or I/O device for communicating over wired or wireless communication link(s).

Computing devices such as a monitor, all-in-one computer, smartphone, tablet computer, etc., may include a touch screen that accepts user input via touching operations performed by a user's fingers or other instrument. For example purposes, a touch sensor grid may overlay the display area. The touch sensor grid contains many touch sensitive areas or cells which may be used to locate the area closest to the input of a user's touch.

System 500 may include touchscreen display 520 and gesture determiner 516. Touchscreen display 520 may be a screen on any device on which a user is operating one or more document representations, such as 102, 104, 106 and 108. Touchscreen display 520 may receive user input as keystrokes, pinches and/or other senses detected from the user. These inputs from the user are received by gesture determiner 516 that interprets the inputs as commands on how to operate or manipulate carousel display 100 (e.g., as performed by carousel manager 512).

Example touch operations using the touchscreen display 520 may include (but are not limited to) pinching, finger (or other stylus or object) touches, finger releases, and finger slides. The touch operations are interpreted by gesture determiner 516 as commands by which to manipulate or operate carousel display 100. For example, a user may zoom out on a viewport (e.g., by pinching a representation and then expanding the fingers), however if the representation is already scaled near 100% (e.g., 80% or above), then gesture determiner 516 or carousel manager 512 determines that the pinch was unintentional and upon finger release, scale the viewport to 100%. In an embodiment, a 100% scale for a representation of a document may result in the top edge of the document being aligned with the top edge of carousel display 100 and the bottom edge of the document being aligned with the bottom edge of carousel display 100.

Gesture determiner 516 may interpret a horizontal swipe of the fingers on the touchscreen display 520 to represent an action to cause the representations of a carousel display to scroll horizontally in the direction of the swipe. A vertical swipe of the fingers on touchscreen display 520 may be interpreted to represent an action to cause the representations of a carousel display to scroll vertically in the direction of the swipe. In another embodiment, pinch zoom-in and zoom-out gestures cause gesture determiner 516 to provide a signal to carousel manager 512 to zoom in and zoom out of the entire carousel display.

Gesture determiner 516 interprets a pinch zoom-in or zoom-out gesture that exceeds a threshold to suggest a deletion or initial removal of a representation from the carousel display. Such an action may cause the representation to appear with a closed document representation 402 in lieu of and/or in conjunction with the representation. If the user releases a pinch zoom-in while the threshold is exceeded, the representation is removed from the carousel display. If the user continues the pinch and zooms out beyond the threshold, the representation remains or is re-zoomed as a representation based on the pinched scaling.

Figure 6:
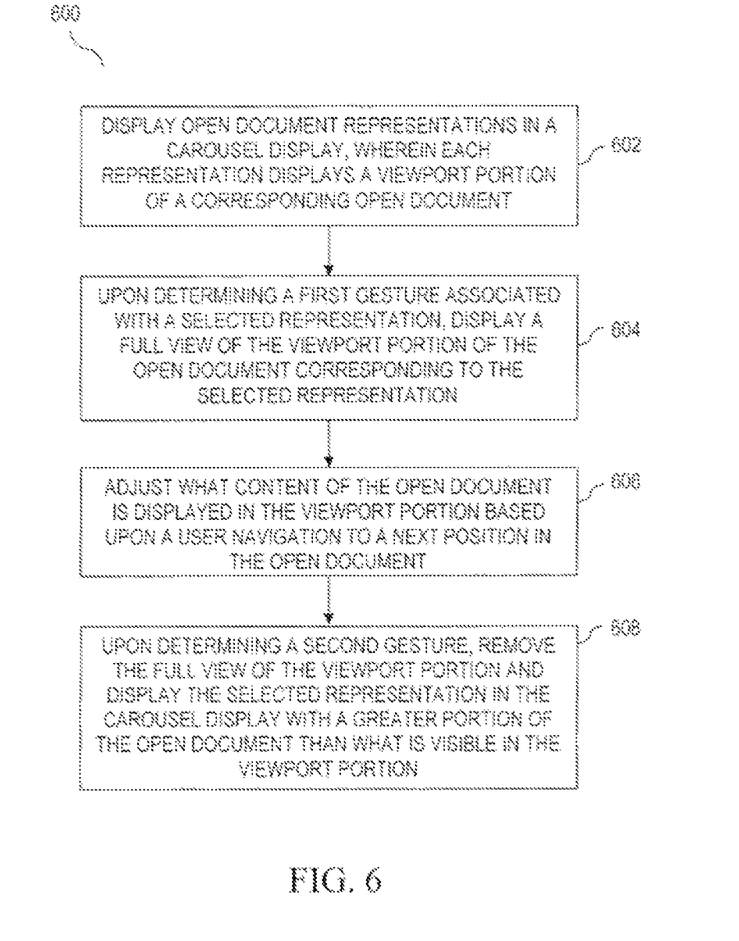
FIG. 6 is an example method for managing opening documents.

FIG. 6 is an example method 600 for managing opening documents. At step 602, open document representations are displayed in a carousel display, wherein each representation displays a document viewport portion of a corresponding open document. For example, as shown in FIG. 1, carousel display 100 includes document viewport portions of the corresponding open documents for representations 102, 104, 106 and 108.

At step 604, upon determining a first gesture associated with a selected representation, a full view of the document viewport portion of the open document corresponding to the selected representation is displayed. For example, gesture determiner 516 interprets a gesture selection of the document representation 106 from FIG. 1 and carousel manager 512 provides the full view 202 of the document of representation 106.

At step 606, the content of the open document displayed in the document viewport portion is adjusted based upon a user navigation to a next position in the open document. For example, the selected document representation 106 from FIG. 1 may have been selected and scrolled through based upon a user navigation of the document to a next position as shown in FIG. 2.

At step 608, upon determining a second gesture, the full view of the document viewport portion is removed and the selected representation is displayed in the carousel display with a greater portion of the open document than what is visible in the document viewport portion. For example, when returning carousel display 100, as shown in FIG. 3, document viewport portion 106A appears to reflect the new position, and the full-view, such as full-view 202, is closed or removed from view. Any combination of steps 602-608 may be performed with carousel display system 510.

System 500 may also include a display interface (which may include input and output devices such as keyboards, mice, etc.) that forwards graphics, text, and other data from communication infrastructure (or from a frame buffer not shown) for display on a display unit such as touchscreen display 520. The system may also include secondary memory and/or removable storage for allowing computer programs or other instructions to be loaded into computer system 500. Examples of such means may include a program cartridge and cartridge interface (such as that found in video game devices), a removable memory chip (such as an EPROM, or PROM) and associated socket, and other removable storage units and interfaces which allow software and data to be transferred from the removable storage unit to computer system 500.

Figure 7:
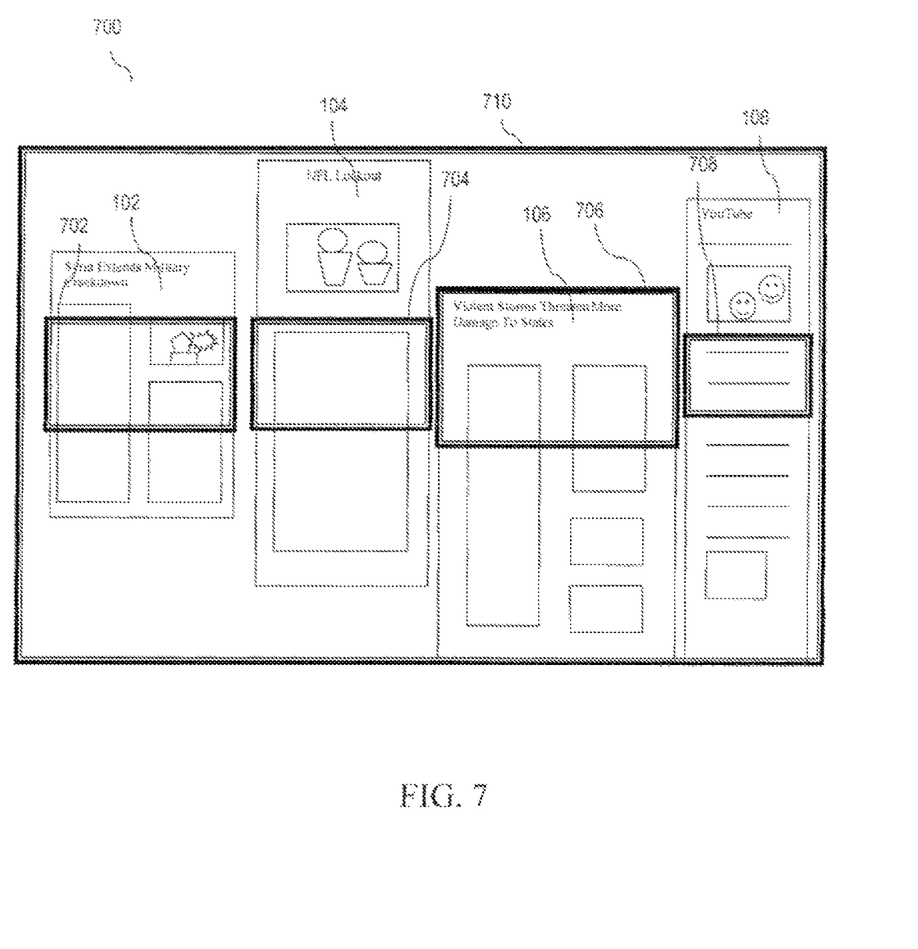
FIG. 7 illustrates another example display view of a carousel display system.

FIG. 7 illustrates another example view 700 of a carousel display. In this example, the carousel display may be displayed in carousel viewport 710. Carousel viewport 710 may not fill the whole display screen as other portions of the display screen may be used for other purposes such as for a menu bar or on-screen keyboard. Document representations 102, 104, 106 and 108 of the carousel display may show portions of the documents through document viewports 702, 704, 706 and 708. The portion visible in each document viewport illustrates the portion that would be displayed in full view mode in viewport 710. The full view of a document would fill viewport 710. In this embodiment, the aspect ratio of each document viewport matches that of viewport 710. The document representations may be of different sizes resulting in document viewports of different sizes to match the aspect ratio of viewport 710. In this example, the centers of the document viewports are vertically aligned.

Embodiments may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The Summary and Abstract sections may set forth one or more but not all exemplary embodiments contemplated by the inventor(s), and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system comprising:
    a carousel manager, implemented by one or more processor-based devices, configured to output, for display, a carousel display including a plurality of active document representations, wherein each of the plurality of active document representations includes a document viewport portion of content from a corresponding active document, and the carousel display is operable, responsive to receiving an indication of a first user gesture selecting a first active document representation from the plurality of active document representations, to cause a full view of the corresponding active document to be output for display;
    the carousel manager further operable to monitor, for the first active document representation, an inactivity period time value representing a period of time during which the corresponding active document has not been accessed; and
    the carousel manager further configured to decrease a size of the first active document representation relative to other active document representations from the plurality of active document representations based on the inactivity period time value.

2. The system of claim 1, wherein the carousel manager is further configured to change display locations of the plurality of representations based on a rotation of the carousel display.

3. The system of claim 1, wherein the carousel manager is further configured to adjust content from the corresponding active document that is displayed in a respective document viewport portion based on the user having scrolled to another scroll position of the corresponding active document in the full view of the corresponding active document.

4. The system of claim 1, wherein the carousel manager is further configured to output, for display, dynamic content of one or more of the plurality of representations.

5. The system of claim 1, wherein each active document representation includes a portion of the active document content outside the document viewport portion, and the portion of the active document content outside of the document viewport portion is deemphasized relative to the document viewport portion the document viewport portion.

6. A The system of claim 1, wherein each active document representation includes a portion of the active document content outside the document viewport portion, and the document viewport portion of each active document representation is emphasized relative to the portion of the active document content outside the document viewport portion.

7. The system of claim 1, wherein two or more of the plurality of representations represent open web browser tabs.

8. The system of claim 1, wherein the carousel manager is further configured to adjust a display size of each of the representations in the carousel display based on a number of representations in the carousel display.

9. The system of claim 1, wherein the carousel manager decreases the size of the first active document representation based on the inactivity period value responsive to determining that the inactivity period value is greater than a threshold time value.

10. A computer program product comprising a non-transitory computer readable storage medium having control logic stored therein, the control logic executed by a processor and, the control logic comprising:
   a first computer readable program code to cause the processor to output, for display, a carousel display including a plurality of active document representations, the plurality of active document representations including a first active document representation, wherein each of the plurality of representations includes a document viewport portion of a corresponding active document, and the carousel display is operable, responsive to receiving an indication of a first user gesture selecting a first active document representation from the plurality of active document representations, to cause a full view of the corresponding active document to be output for display;
   a second computer readable program code to cause the processor to monitor, for the first active document representation, an inactivity period time value representing a period of time during which the corresponding active document has not been accessed; and
   a third computer readable program code to cause the processor to decrease, for display, a size of the first active document representation relative to other active document representations from the plurality of active document representations based on the inactivity period time value.

11. The computer program product of claim 10, wherein the second computer readable code causes the processor to decrease the size of the first active document representation based on the inactivity period value responsive to determining that the inactivity period value is greater than a threshold time value.

12. A computer-implemented method comprising:
   outputting, for display, a carousel display including a plurality of active document representations, wherein each of the plurality of active document representations includes a document viewport portion of content from a corresponding active document, and the carousel display is operable, responsive to receiving an indication of a first user gesture selecting a first active document representation from the plurality of active document representations, to cause a full view of the corresponding active document to be output for display;
   monitoring, for the first active document representation, an inactivity period time value representing a period of time during which the corresponding active document has not been accessed; and
   decreasing a size of the first active document representation relative to other active document representations from the plurality of active document representations based on the inactivity period time value.

13. The method of claim 12, further comprising changing display locations of the plurality of representations based on a rotation of the carousel display.

14. The method of claim 12, further comprising adjusting content of an active document that is displayed in a respective document viewport portion based on the user having scrolled to another scroll position of the active document.

15. The method of claim 12, wherein outputting, for display, a plurality of active document representations includes outputting, for display dynamic content of one or more of the plurality of representations.

16. The method of claim 12, wherein each active document representation includes a portion of the active document content outside the document viewport portion, and the portion of the active document content outside of the document viewport portion is deemphasized relative to the document viewport portion.

17. The method of claim 12, wherein each active document representation includes a portion of the active document content outside the document viewport portion, and the document viewport portion of each active document representation is emphasized relative to the portion of the active document content outside the document viewport portion.

18. The method of claim 12, wherein two or more of the plurality of representations represent active web browser tabs.

19. The method of claim 12, further comprising adjusting a display size of each of the representations in the carousel display based on a number of representations in the carousel display.

20. The method of claim 12, wherein decreasing the size of the first active document representation based on the inactivity period value is performed responsive to determining that the inactivity period value is greater than a threshold time value.

* * * * *